United States Patent
Rosas et al.

(10) Patent No.: US 12,545,522 B2
(45) Date of Patent: Feb. 10, 2026

(54) CONVEYOR ASSEMBLY

(71) Applicant: Intelligrated Headquarters, LLC, Mason, OH (US)

(72) Inventors: Shanty Rosas, Mexico City (MX); Sarahi Romero, Mexico City (MX)

(73) Assignee: Intelligrated Headquarters, LLC, Mason, OH (US)

( * ) Notice: Subject to any disclaimer, the term of this patent is extended or adjusted under 35 U.S.C. 154(b) by 80 days.

(21) Appl. No.: 18/427,560

(22) Filed: Jan. 30, 2024

(65) Prior Publication Data

US 2025/0243006 A1   Jul. 31, 2025

(51) Int. Cl.
*B65G 21/20* (2006.01)

(52) U.S. Cl.
CPC ................. *B65G 21/2072* (2013.01)

(58) Field of Classification Search
CPC .......... B65G 21/2072; B65G 21/2082
USPC ............................. 198/836.1–836.4
See application file for complete search history.

(56) References Cited

U.S. PATENT DOCUMENTS

| | | | | |
|---|---|---|---|---|
| 4,958,725 A * | 9/1990 | Meade | | B65G 21/2072 198/836.1 |
| 5,031,757 A * | 7/1991 | Draebel | | B65G 17/086 198/852 |
| 5,082,108 A * | 1/1992 | Douglas | | B65G 21/06 198/860.3 |
| 5,320,210 A | 6/1994 | Van Den Bergh et al. | | |
| 5,361,894 A * | 11/1994 | Solcz | | B65G 21/06 198/860.1 |
| 6,244,429 B1 * | 6/2001 | Drewitz | | B65G 21/2072 198/836.3 |
| 6,296,111 B1 | 10/2001 | Mekanik et al. | | |
| 6,378,695 B1 * | 4/2002 | Rinne | | B65G 21/2072 198/836.3 |
| 6,427,831 B1 * | 8/2002 | Norton | | B65G 21/06 198/841 |
| 6,666,325 B1 * | 12/2003 | Buenning | | B65G 39/12 198/860.3 |
| 8,590,697 B2 * | 11/2013 | Lim | | B65G 21/2072 198/860.1 |
| 9,598,244 B2 | 3/2017 | Snabb et al. | | |
| 9,663,303 B2 | 5/2017 | Waldner et al. | | |
| 9,914,591 B2 | 3/2018 | Degroot et al. | | |
| 2002/0148709 A1 * | 10/2002 | Claig | | B65G 21/2072 198/860.1 |
| 2004/0094384 A1 * | 5/2004 | Shaw | | B65G 1/023 193/35 R |

(Continued)

FOREIGN PATENT DOCUMENTS

JP      H072333    *  7/1995

OTHER PUBLICATIONS

Translation of JP-H072333 (Year: 2025).*

*Primary Examiner* — Mark A Deuble
(74) *Attorney, Agent, or Firm* — Alston & Bird LLP (57) ABSTRACT

A conveyor assembly is disclosed. The conveyor assembly comprises at least one side rail having a plurality of holes, and at least one side guide having a flange portion and a plurality of hooks disposed along a length of the flange portion of the at least one side guide. Further, each of the plurality of hooks is positioned within a corresponding hole of the plurality of holes. The at least one side guide is coupled to the at least one side rail with the plurality of hooks.

18 Claims, 9 Drawing Sheets

(56) References Cited

U.S. PATENT DOCUMENTS

2011/0042186 A1* 2/2011 Ellis .................... B65G 11/166
  198/836.1
2015/0353286 A1  12/2015 Hendrickson et al.
2023/0211958 A1* 7/2023 Lindorfer .............. B65G 21/06
  198/860.3

* cited by examiner

CONVEYOR ASSEMBLY

TECHNOLOGICAL FIELD

Example embodiments of the present disclosure relate generally to installation of a conveyor assembly, and more particularly, to conveyor assemblies for joining side guides in conveyor frames.

BACKGROUND

Conveyor assemblies play a pivotal role in various industries, facilitating the efficient transportation of goods along production lines. However, traditional conveyor assemblies often present challenges in terms of installation time, operator safety, and ease of assembly and disassembly. Designs of these traditional conveyor assemblies typically involve the utilization of numerous nuts, washers, and screws, leading to prolonged installation times and increased complexity in the assembly process. Also, excessive reliance on individual components not only extends the installation timeframe but also introduces an element of inefficiency. Moreover, the cumbersome nature of traditional conveyor assemblies contributes to the overall difficulty in both installation and uninstallation procedures. Such intricate interplay of nuts, washers, and screws often results in a time-consuming and intricate process, requiring skilled personnel and specialized tools. Such complexity not only hampers the efficiency of assembly but also leads to challenges during maintenance or system reconfiguration.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a summary of some example embodiments to provide a basic understanding of some aspects of the present disclosure. This summary is not an extensive overview and is intended to neither identify key or critical elements nor delineate the scope of such elements. It will also be appreciated that the scope of the disclosure encompasses many potential embodiments in addition to those here summarized, some of which will be further described in the detailed description that is presented later.

In an example embodiment, a conveyor assembly is disclosed. The conveyor assembly comprises at least one side rail having a plurality of holes, and at least one side guide having a flange portion and a plurality of hooks disposed along a length of the flange portion of the at least one side guide. Further, each of the plurality of hooks is positioned within a corresponding hole of the plurality of holes. The at least one side guide is coupled to the at least one side rail with the plurality of hooks.

In some embodiments, each of the plurality of hooks is firmly secured by bending each of the plurality of hooks after being interlocked with the plurality of holes. In some embodiments, each of the plurality of hooks corresponds to a U-shaped hook that is configured to allow adjustable attachment to the at least one side rail.

In some embodiments, the at least one side guide has plurality of notches to hold the plurality of hooks.

In some embodiments, the interlocking between the plurality of hooks of the at least one side guide and the plurality of holes of the at least one side rail is frictionally secured.

In some embodiments, the plurality of hooks and the plurality of holes are equidistantly spaced along the length of the flange portion of the at least one side guide and the at least one side rail, respectively.

In some embodiments, the at least one side guide with the plurality of hooks comprises stainless steel, carbon fiber, carbon steel, silicon, or a combination thereof. In some embodiments, the plurality of hooks is coated with a friction-enhancing material for engagement with the at least one side rail. In some embodiments, the plurality of hooks is configured to accommodate variations in dimensions of the plurality of holes of the at least one side rail.

In some embodiments, each of the plurality of hooks has a width of at least 0.72 and up to 0.75. Each of the plurality of holes has a dimension that is at least 0.32 and up to 0.35.

In some embodiments, each of the plurality of hooks is interlocked with the corresponding hole of the plurality of holes.

In some embodiments, each of the plurality of holes defines a rectangular shape.

In some embodiments, each of the plurality of hooks defines a curved portion. Each of the plurality of hooks defines a straight portion at a distal end of the hook. The straight portion defines a bend angle. The curved portion defines a radius of curvature and the radius of curvature is 0.156.

In another example embodiment, a method of coupling the at least one side rail with the at least one side guide of the conveyor assembly is disclosed. The method comprises steps of positioning the at least one side guide above the at least one side rail; aligning each of the plurality of hooks of the at least one side guide with a corresponding hole of the plurality of holes of the at least one side rail; positioning each of the plurality of hooks of the at least one side guide within the corresponding hole of the plurality of holes of the at least one side rail; and bending each of the plurality of hooks to couple the at least one side rail to the at least one side guide.

In some embodiments, the method comprises bending each of the plurality of hooks comprises bending a distal end of each of the plurality of hooks in an upward direction.

In some embodiments, each of the plurality of hooks defines a curved portion, and each of the plurality of hooks defines a straight portion at a distal end of the hook, prior to the step of bending each of the plurality of hooks. The straight portion of each of the plurality of hooks extends at a first angle of 137 degrees with respect to a plane of the flange portion of the at least one side guide. After the step of bending each of the plurality of hooks, the straight portion of each of the plurality of hooks extends at a second angle that is less than 15 degrees with respect to the plane of the flange portion of the at least one side guide.

In some embodiments, the method further comprises bending each of a plurality of tabs on the flange portion of the at least one side guide to form the plurality of hooks, wherein the step of bending each of the plurality of tabs occurs prior to the step of bending each of the plurality of hooks.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments of the present disclosure are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of conveyor assemblies or frames and methods of coupling side rails with side guides. Embodiments may position the side guide above the side rail. In further embodiments, each of a plurality of hooks of the side guide may be aligned with a corresponding hole of the plurality of holes of the side rail. Embodiments may position each of the plurality of hooks of the side guide within the corresponding hole of the plurality of holes of the side rail. Thereafter, bending each of the plurality of hooks to couple the side rail to the side guide.

Figure 1:
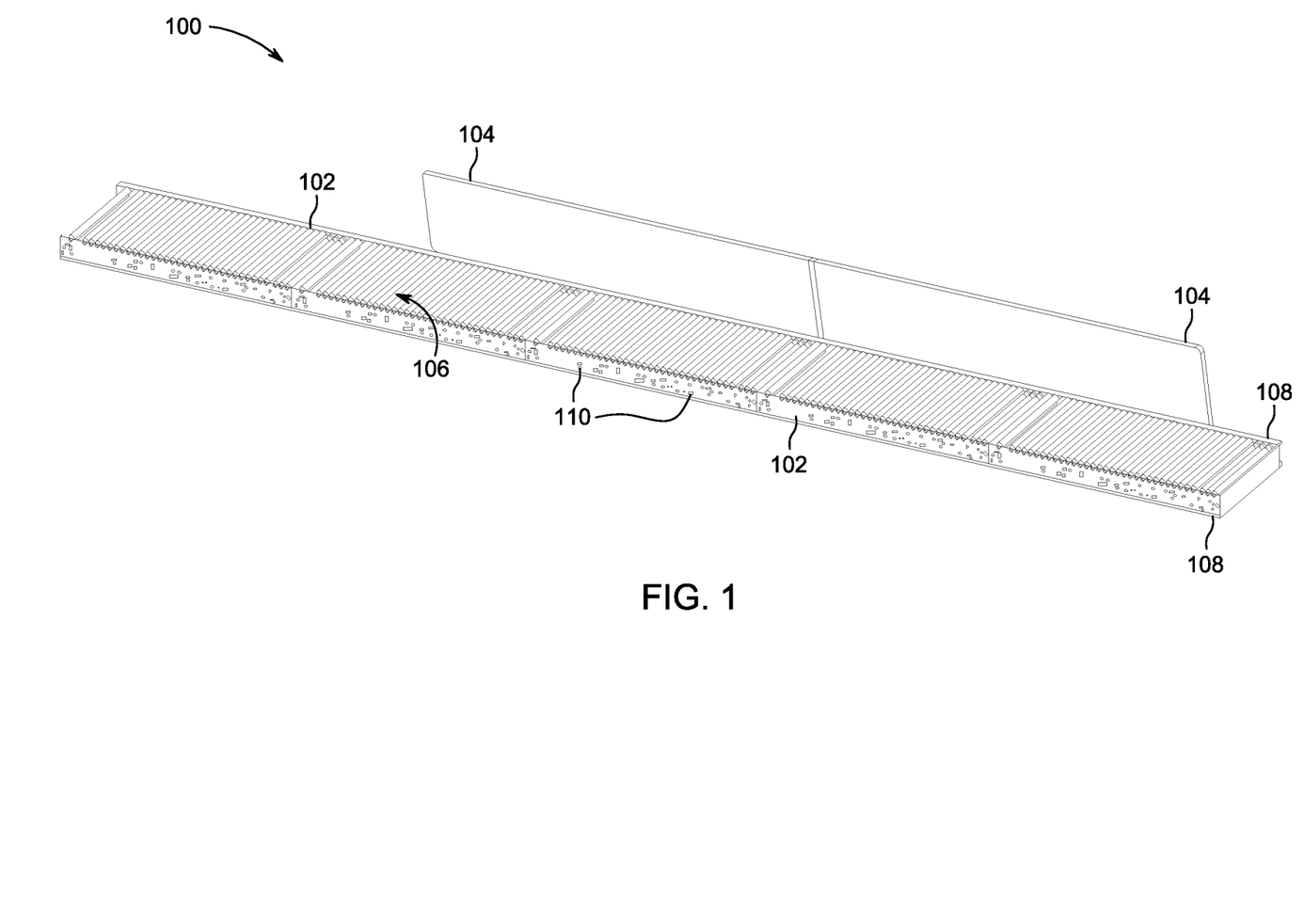
FIG. 1 illustrates an isometric view of a conveyor assembly in accordance with an example embodiment of the present disclosure.

FIG. 1 illustrates an isometric view of a conveyor assembly 100, in accordance with an example embodiment of the present disclosure.

The conveyor assembly 100 may comprise at least one side rail 102 and at least one side guide 104. The at least one side guide 104 may be positioned perpendicularly over the at least one side rail 102. The at least one side rail 102 may be disposed on either side of the conveyor assembly 100. Further, the conveyor assembly 100 may comprise a plurality of rollers 106. The plurality of rollers 106 may be disposed between each of the at least one side rail 102. In some example embodiments, the conveyor assembly 100 may have at least two side rails such that the plurality of rollers 106 may be disposed between the at least two side rails. The plurality of rollers 106 may be configured to displace one or more packages (not shown) via the conveyor assembly 100. In various examples, the at least one side rail 102 may have a structure of a cross-sectional C-shape with at least two flanges 108 that extend generally horizontally from a side that extends generally vertically. It may be noted that the at least one side rail 102 may have a structure of an I-section with at least two flanges 108 on either side. Further, the at least one side rail 102 may be fabricated with a plurality of slots 110 of multiple dimensions along the length of the at least one side rail 102 between the at least two flanges 108. Such slots 110 may enhance durability and strength to the at least one side rail 102 and thus enhance the strength of the conveyor assembly 100. In some embodiments, the plurality of slots 110 of the at least one side rail 102 may be utilized for coupling various components, such as the plurality of rollers 106, etc.

Figure 2:
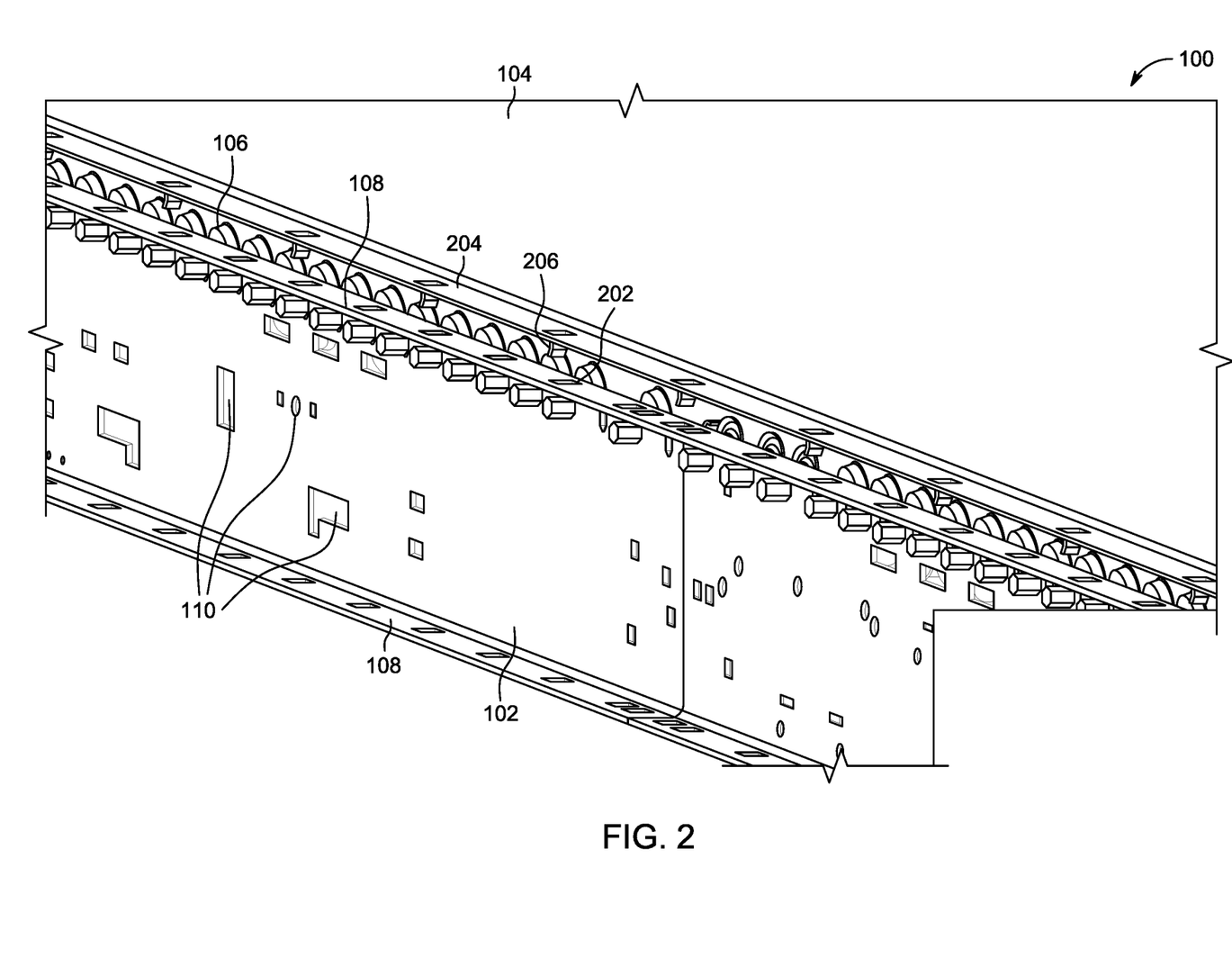
FIG. 2 illustrates an isometric view of at least one side guide and at least one side rail in accordance with an example embodiment of the present disclosure.
Figure 3:
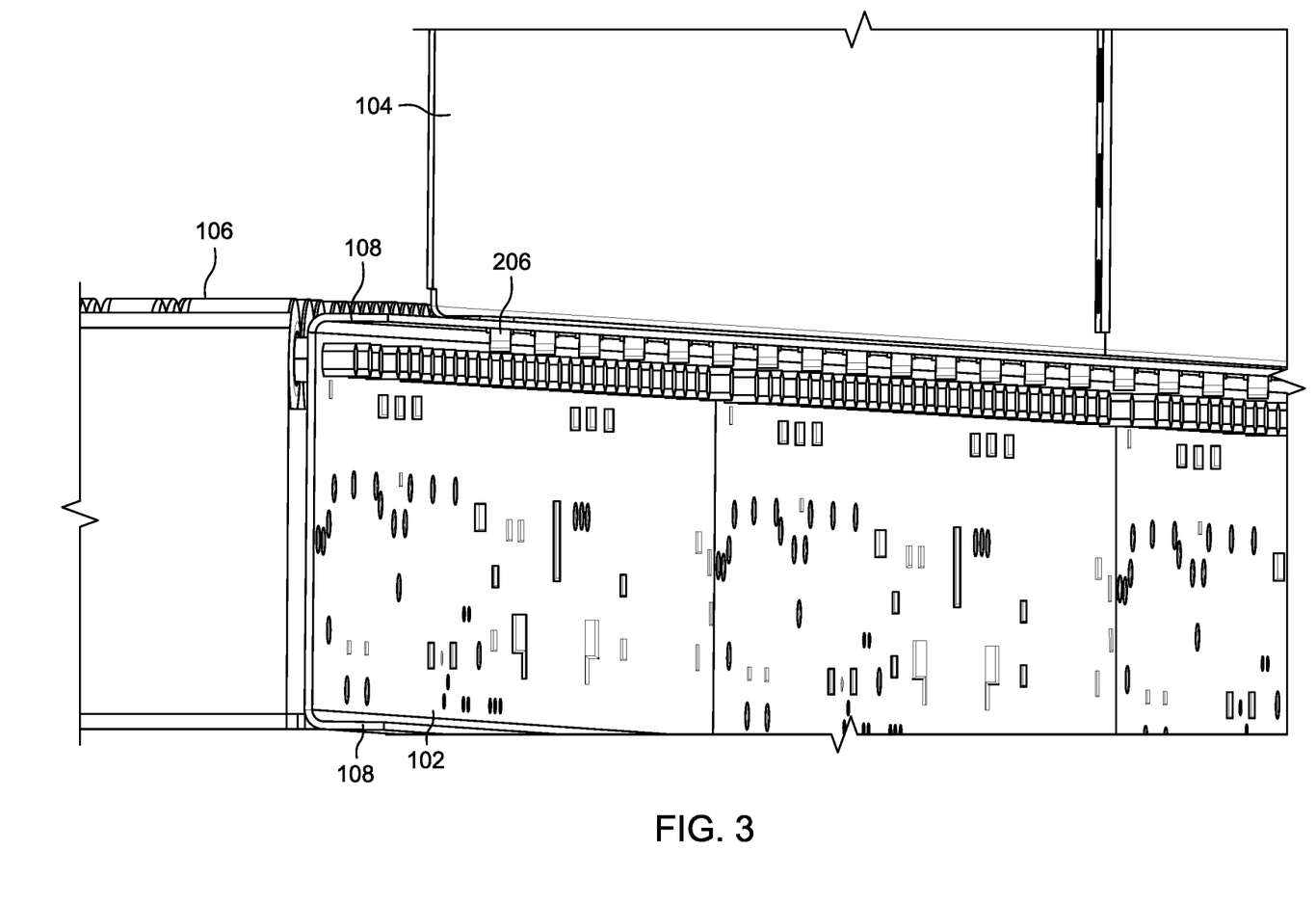
FIG. 3 illustrates a side view of the at least one side guide and at least one side rail of the conveyor assembly with an example embodiment of the present disclosure.

FIG. 2 illustrates an isometric view of the at least one side guide 104 and the at least one side rail 102 of the conveyor assembly 100, in accordance with an example embodiment of the present disclosure. FIG. 3 illustrates a side view of the at least one side guide 104 and at least one side rail 102 of the conveyor assembly 100, in accordance with an example embodiment of the present disclosure. FIGS. 2-3 are described in conjunction with FIG. 1.

The at least one side rail 102 may comprise a plurality of holes 202. It may be noted that the plurality of holes 202 may be integrated on the at least one flange of the at least two flanges 108 of the at least one side rail 102 that is positioned proximal to the at least one side guide 104. Further, the at least one side guide 104 may comprise a flange portion 204 and a plurality of hooks 206. The plurality of hooks 206 may be disposed along a length of the flange portion 204 of the at least one side guide 104. The plurality of hooks 206 may be protruding from the flange portion 204 of the at least one side guide 104 towards the at least one side rail 102. For example, the plurality of hooks 206 may extend downward from the flange portion 204. In some embodiments, each of the plurality of hooks 206 may be positioned within a corresponding hole of the plurality of holes 202 of the at least one side rail 102. Further, each of the plurality of hooks 206 may be firmly secured by bending each of the plurality of hooks 206 after being interlocked with the plurality of holes 202. Therefore, the at least one side guide 104 may be coupled to the at least one side rail 102 with the plurality of hooks 206.

In some embodiments, the at least one side guide 104 may be provided with a plurality of notches 606 (FIG. 6) by a gripper (not shown) to hold the plurality of hooks 206. In some embodiments, the plurality of hooks 206 may be equidistantly spaced along the length of the flange portion 204 of the at least one side guide 104. Further, the plurality of holes 202 may be disposed equidistantly on the at least one side rail 102 corresponding to the plurality of hooks 206. In some example embodiments, the at least one side rail 102 may be manufactured from sheet metal and each of the plurality of holes 202 are cut into the sheet metal. In some example embodiments, the plurality of holes 202 may be cut-out from the at least one side rail 102. It may be noted that the at least one side rail 102 may not experience any deformations while interlocking the plurality of hooks 206 within the plurality of holes 202. In some embodiments, the plurality of hooks 206 may correspond to a U-shaped hook that may be configured to allow adjustable attachment to the at least one side rail 102.

In some embodiments, the interlocking between the plurality of hooks 206 of the at least one side guide 104 and the plurality of holes 202 of the at least one side rail 102 may be frictionally secured. In some embodiments, the plurality of hooks 206 may be coated with a friction-enhancing material for engagement with the plurality of holes 202 of the at least one side rail 102. In some example embodiments, the at least one side guide 104 with the plurality of hooks 206 may be made from materials such as, but are not limited to, stainless steel, carbon fiber, carbon steel, silicon, or a combination thereof.

Figure 4:
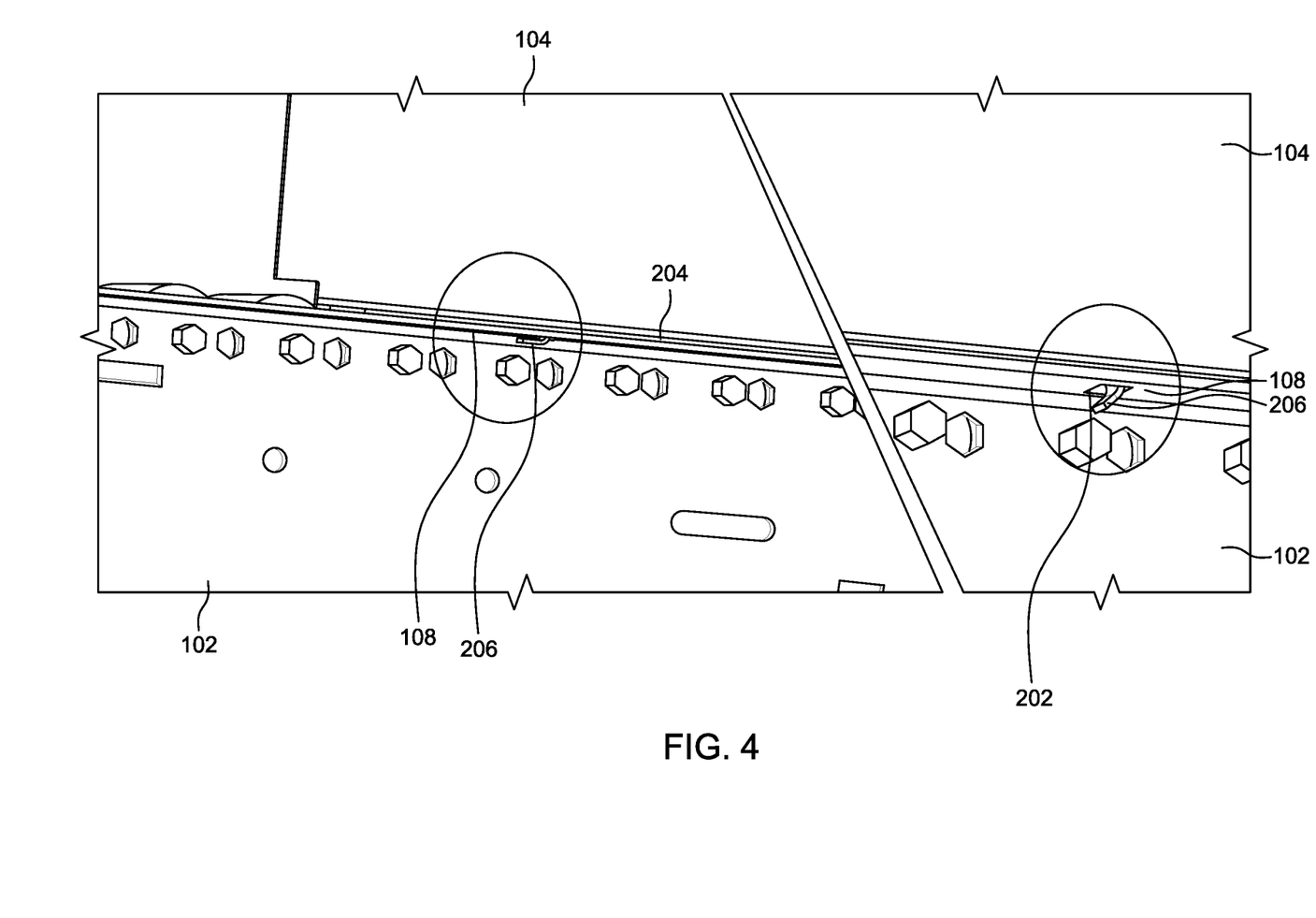
FIG. 4 illustrates an enlarged view of the at least one side guide coupled with the at least one side rail in accordance with an example embodiment of the present disclosure.

FIG. 4 illustrates an enlarged view of the at least one side guide 104 coupled with the at least one side rail 102, in accordance with an example embodiment of the present disclosure.

As discussed in FIGS. 2 and 3, the plurality of hooks 206 of the at least one side guide 104 may be inserted within the plurality of holes 202 of the at least one side rail 102. Successively, the plurality of hooks 206 may be bent after being aligned with the corresponding plurality of holes 202. In some embodiments, a plier, such as tweezer pliers, may be utilized to bend the plurality of hooks 206 to an approximately same plane as the flange portion 204 of the at least one side guide 104 or one flange of the at least two flanges 108 of the at least one side rail 102. The plurality of hooks 206 may be configured to accommodate variations in dimensions of the plurality of holes 202 of the at least one side rail 102. In some embodiments, each of the plurality of holes 202 may have a dimension that is at least 0.406 and up to 0.436. In some embodiments, each of the plurality of hooks 206 may be interlocked with the corresponding hole of the plurality of holes 202. In some embodiments, each of the plurality of holes 202 may define a rectangular shape.

Figure 5:
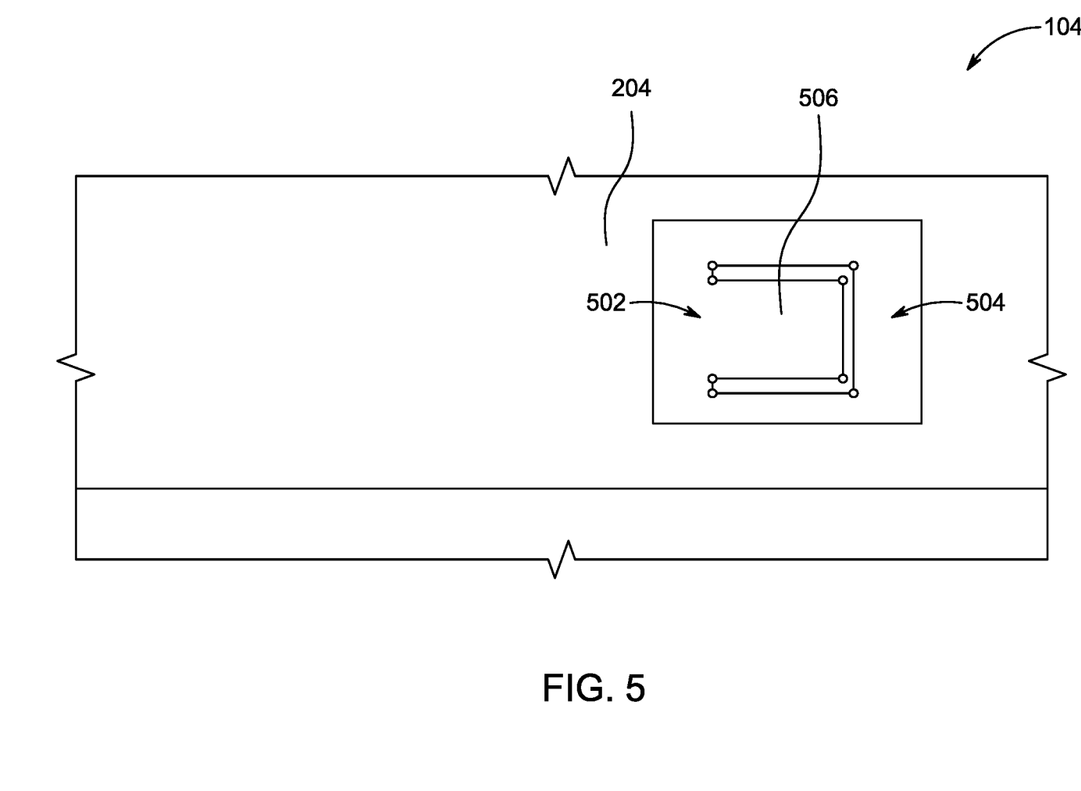
FIG. 5 illustrates a top view of a hook prior to bending step in accordance with an example embodiment of the present disclosure.
Figure 6:
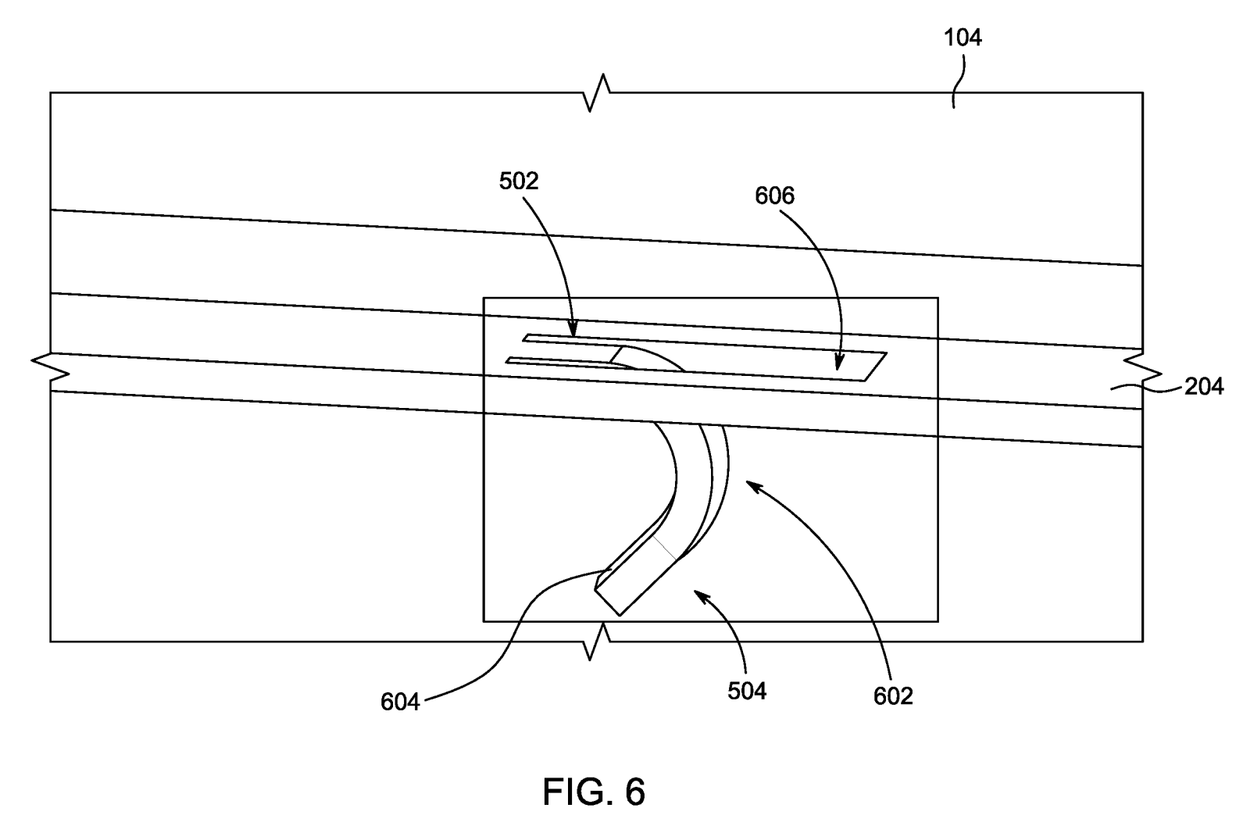
FIG. 6 illustrates a side view of the hook integrated on the at least one side guide in accordance with an example embodiment of the present disclosure.
Figure 7:
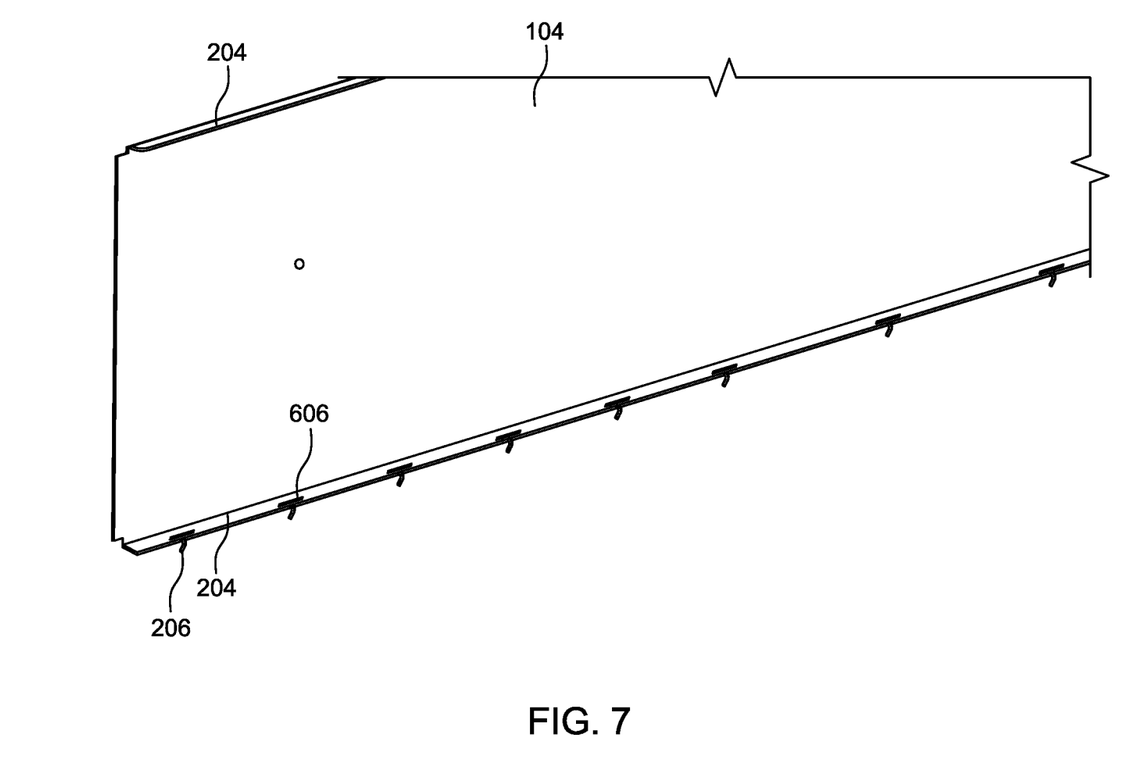
FIG. 7 illustrates an isometric view of the at least one side guide with a plurality of hooks interlocked with the at least one side guide in accordance with an example embodiment of the present disclosure.

FIG. 5 illustrates a top view of the hook of the plurality of hooks 206 prior to bending step, in accordance with an example embodiment of the present disclosure. FIG. 6 illustrates a side view of a hook of the plurality of hooks 206 integrated on the at least one side guide 104, in accordance with an example embodiment of the present disclosure. FIG. 7 illustrates an isometric view of the at least one side guide 104 with the plurality of hooks 206, in accordance with an example embodiment of the present disclosure. FIGS. 5-7 are described in conjunction with FIGS. 1-4.

As illustrated in FIG. 5, the plurality of hooks 206 prior to bending step between a proximal end 502 and a distal end 504 of a hook of the plurality of hooks 206, may form a plurality of tabs 506. The plurality of tabs 506 may be bent downwards to form the plurality of hooks 206. It may be noted that bending each of the plurality of tabs 506 may occur prior to the step of bending each of the plurality of hooks 206. Stated differently, the plurality of tabs 506 may be cut-out of the flange portion 204 of the at least one side guide 104. In some example embodiments, the plurality of tabs 506 may be cut-out from the flange portion 204 with a tolerance gap of 0.05 inch over the flange portion 204. In some embodiments the maximum angle at which the plurality of tabs 506 may bend is 180 degrees.

As discussed earlier, the hook of the plurality of hooks 206 may comprise the proximal end 502 and the distal end 504. The proximal end 502 may be a portion of the hook that may not be cut out of the plane of the flange portion 204 and the distal end 504 may be protruding outwards from the plane of the flange portion 204. As illustrated in FIG. 6, each of the plurality of hooks 206 may define a curved portion 602 between the proximal end 502 and the distal end 504 of the hook. The curved portion 602 may have protruded from the plane of the flange portion 204. It may be noted that the curved portion 602 may be protruding towards the plurality of holes 202 of the at least one side rail 102 when the at least one side guide 104 is positioned above the at least one side rail 102. In some embodiments, the curved portion 602 may be a U-shaped section forming angles between 132 to 137 degrees between bending and interlocking.

As illustrated in FIG. 6, a hook of the plurality of hooks 206 may define a straight portion 604 at the distal end 504 of the hook. It may be noted that the straight portion 604 may define a bend angle. The bend angle may be between 150 to 10 degrees as discussed above. In some embodiments, bending each of the plurality of hooks 206 may correspond to bending the plurality of hooks 206 curved portion 602 of each of the plurality of hooks 206. In some example embodiments, the bend angle may be 137 degrees. Further, tolerance of the plurality of hooks 206 may be +−1 degrees. Further, the curved portion 602 may define a radius of curvature. In some embodiments, the radius of curvature of the curved portion 602 may be 0.156 radians. In some embodiments, each of the plurality of hooks 206 may have a width of at least 0.72 and up to 0.76. In some example embodiments, the width of the hook of the plurality of hooks 206 may be between 8.00 inches to 8.03 inches. It may be noted that a first measure from an edge of the flange portion 204 to the first plurality of hooks 206 may have a width (W) of at least 3.45 and up to 3.48 inches.

In some example embodiments, prior to bending of each of the plurality of hooks 206, the straight portion 604 of each of the plurality of hooks 206 may extend at a first angle of 137 degrees with respect to the plane of the flange portion 204 of the at least one side guide 104. In some embodiments, the first angle may be between 130 to 150 degrees. After the bending of each of the plurality of hooks, the straight portion 604 of each of the plurality of hooks 206 may extend at a second angle that may be less than 15 degrees with respect to the plane of the flange portion 204 of the at least one side guide 104. In some embodiments, the second angle may be between 15 to 0 degrees. As illustrated in FIG. 5, the plurality of hooks 206 may be carved and protruded out of the plane of the flange portion 204 of the at least one side guide 104. The protrusion of the plurality of hooks 206 may leave a plurality of notches 606 along the flange portion 204. The plurality of notches 606 may be formed when the plurality of hooks 206 are bent out of the plane of the flange portion 204 of the at least one side guide 104.

As illustrated in FIG. 7, an isometric view of the at least one side guide 104 with a plurality of hooks 206 interlocked with the at least one side guide 104 in accordance with an example embodiment of the present disclosure.

Figure 8:
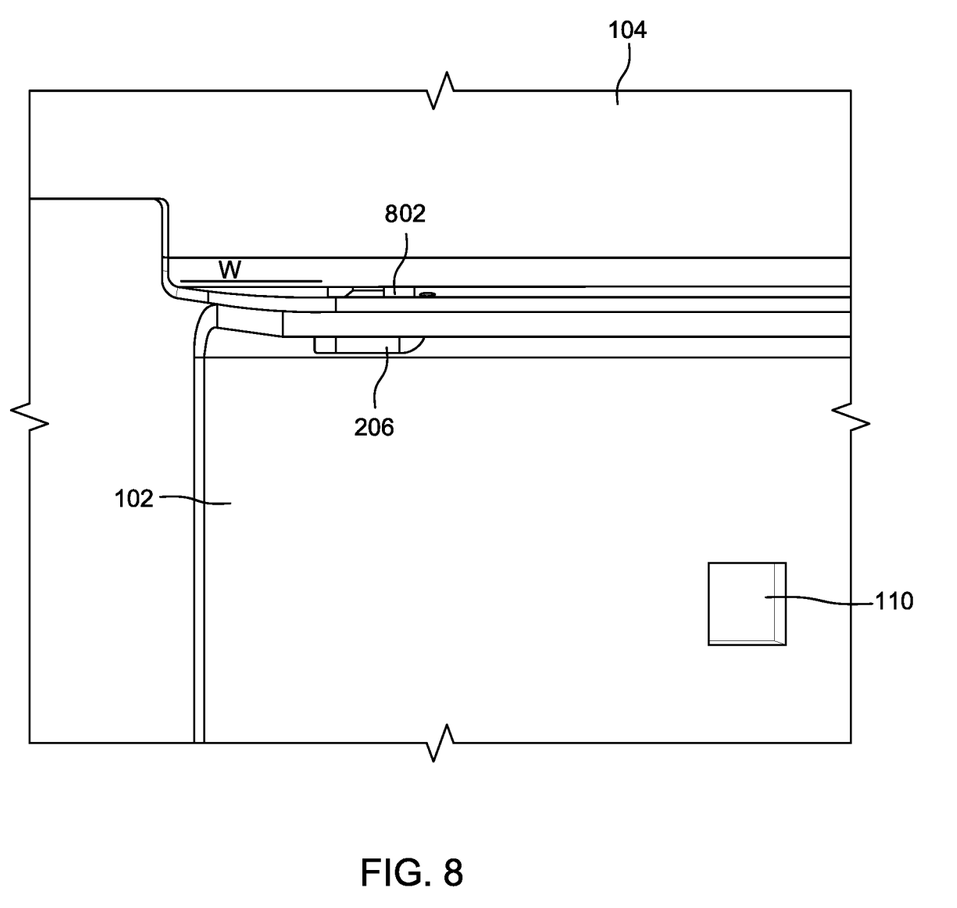
FIG. 8 illustrates a perspective view of the hook integrated on the at least one side guide and fastened by a gripper in accordance with an example embodiment of the present disclosure.

The at least one side guide 104 may be coupled to the at least one side rail 102 by interlocking the plurality of hooks 206 of the at least one side guide 104 within the plurality of holes 202 of the side rail 102. Successively, bending the plurality of hooks 206 towards the side rail 102 to hold securely and tightly to the at least one side guide 104 with the at least one side rail 102. In some embodiments, multiple side guides may be arranged besides each other and perpendicular to the at least one side rail 102. In some example embodiments, the multiple side guides may be notched together for ease of assembly and disassembly. In some embodiments, the plurality of notches 606 may be utilized with a gripper 802 as shown in FIG. 8, to notch the flange portion 204 of the at least one side guide 104 and the at least one flange of the at least two flanges 108 of the at least one side rail 102. It will be apparent that the above mentioned configuration of the at least one side guide 104 with the at least one side rail 102 are provided for illustrative purposes only.

Figure 9:
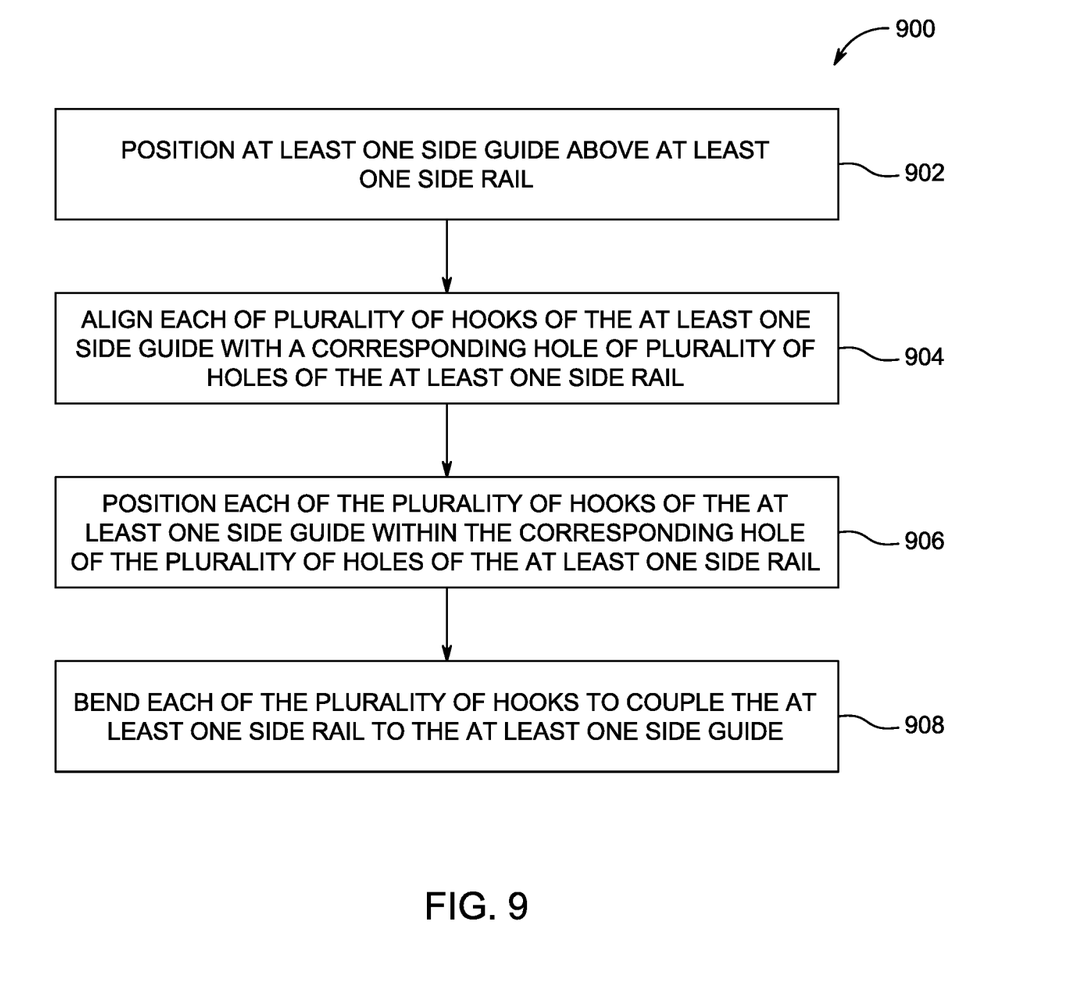
FIG. 9 illustrates a flowchart showing a method of coupling the at least one side rail with the at least one side guide of the conveyor assembly in accordance with an example embodiment of the present disclosure.

FIG. 9 illustrates a flowchart 900 showing a method of coupling the at least one side rail with the at least one side guide of the conveyor assembly 100, in accordance with an example embodiment of the present disclosure. FIG. 9 is described in conjunction with FIGS. 1-8.

At operation 902, the at least one side guide 104 may be positioned above the at least one side rail 102. For example, the at least one side guide 104 may be placed perpendicular to the at least one side rail 102, such as the at least two flanges 108 of the at least one side rail 102 may be co-planar with the flange portion 204 of the at least one side guide 104. In various example, the at least one side guide 104 may be positioned above the at least one side rail 102 such that the flange portion 204 of the side guide 104 extends generally parallel with the at least two flanges 108 of the at least one side rail 102.

At operation 904, each of the plurality of hooks 206 of the at least one side guide 104 may be aligned with a corresponding hole of the plurality of holes 202 of the at least one side rail 102. For example, once the at least one side guide 104 is placed perpendicular to at least a portion of the at least one side rail 102, the flange portion 204 of the at least one side guide 104 faces the one flange of the at least two flanges 108 of the at least one side rail 102. As discussed above, the at least two flanges 108 of the at least one side rail 102 may be co-planar with the flange portion 204 of the at least one side guide 104. Further, the plurality of hooks 206 on the flange portion 204 may be aligned with the plurality of holes 202 of the at least one side rail 102.

At operation 906, each of the plurality of hooks 206 of the at least one side guide 104 may be positioned within the corresponding hole of the plurality of holes 202 of the at least one side rail 102. For example, once the plurality of hooks 206 on the flange portion 204 are aligned with the plurality of holes 202 of the at least one side rail 102, each hook of the plurality of hooks 206 may be positioned within its corresponding hole of the plurality of holes 202.

At operation 908, each of the plurality of hooks 206 may be bent to couple the at least one side rail 102 to the at least one side guide 104. For example, once positioned within the corresponding hole, the hook is bent using a tweezer or other mechanical tool, such as pliers, such that the at least one side guide 104 is coupled firmly to at least a portion of the at least one side rail 102. In various examples, the at least one side guide 104 is stacked on the at least one side rail 102 after the at least one side guide 104 is coupled to the side rail 102. For example, the flange portion 204 of the at least one side guide 104 may extend parallel to the at least two flanges 108 of the at least one side rail 102 to which it may be coupled.

In some example embodiments, each of the plurality of tabs 506 on the flange portion 204 of the at least one side guide 104 may be bent to form the plurality of hooks 206. As discussed earlier, prior to the step of bending, at operation 808, of each of the plurality of hooks 206, the straight portion 604 of each of the plurality of hooks 206 is extend at the first angle of 137 degrees with respect to the plane of the flange portion 204 of the at least one side guide 104. After the bending of each of the plurality of hooks, the straight portion 604 of each of the plurality of hooks 206 extends at the second angle that is less than 15 degrees with respect to the plane of the flange portion 204 of the at least one side guide 104.

It will be apparent that the step of bending each of the plurality of tabs 506 may occur prior to the step of bending each of the plurality of hooks 206.

In various embodiments, the conveyor assembly 100 with the plurality of hooks 206 along the flange portion 204 of the at least one side guide 104 may present several advantages over traditional designs employing fastener holes. In some embodiments, the U-shape of the plurality of hooks 206 may provide a more versatile and secure attachment method, eliminating the need for precise alignment with pre-drilled holes. Such shape and dimensions of the plurality of hooks 206 may simplify joint system of the conveyor assembly 100 and may facilitate easier adjustments and modifications, enhancing overall flexibility in conveyor system configurations.

In some embodiments, the conveyor assembly 100 with the coupling of the at least one side rail 102 with the at least one side guide 104 using the plurality of hooks 206 interlocked within the plurality of holes 202 may minimize risk of dislodgment or misalignment during conveyor operation. Such interlock or coupling may contribute to increased operational efficiency and reduced maintenance requirements. Additionally, absence of traditional fasteners also translates to a streamlined appearance and reduced material and labor costs associated with manufacturing and installation.

Many modifications and other embodiments of the disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A conveyor assembly comprising:
at least one side rail having a plurality of holes; and
at least one side guide having a flange portion and a plurality of hooks disposed along a length of the flange portion of the at least one side guide,
wherein each of the plurality of hooks is positioned within a corresponding hole of the plurality of holes, and
wherein the at least one side guide is coupled to the at least one side rail with the plurality of hooks, and
wherein the at least one side guide comprises a plurality of notches to hold the plurality of hooks.

2. The conveyor assembly of claim 1, wherein each of the plurality of hooks is firmly secured by bending each of the plurality of hooks after being interlocked with the plurality of holes.

3. The conveyor assembly of claim 1, wherein each of the plurality of hooks corresponds to a U-shaped hook that is configured to allow adjustable attachment to the at least one side rail.

4. The conveyor assembly of claim 1, wherein interlocking between the plurality of hooks of the at least one side guide and the plurality of holes of the at least one side rail is frictionally secured.

5. The conveyor assembly of claim 1, wherein the plurality of hooks and the plurality of holes are equidistantly spaced along the length of the flange portion of the at least one side guide and the at least one side rail, respectively.

6. The conveyor assembly of claim 1, wherein the at least one side guide with the plurality of hooks comprises stainless steel, carbon fiber, carbon steel, silicon, or a combination thereof.

7. The conveyor assembly of claim 1, wherein the plurality of hooks is coated with a friction-enhancing material for engagement with the at least one side rail.

8. The conveyor assembly of claim 1, wherein the plurality of hooks is configured to accommodate variations in dimensions of the plurality of holes of the at least one side rail.

9. The conveyor assembly of claim 1, wherein each of the plurality of hooks has a width of at least 8.00 inches and up to 8.03 inches.

10. The conveyor assembly of claim 1, wherein each of the plurality of hooks is interlocked with the corresponding hole of the plurality of holes.

11. The conveyor assembly of claim 1, wherein each of the plurality of holes defines a rectangular shape.

12. The conveyor assembly of claim 1, wherein each of the plurality of hooks defines a curved portion.

13. The conveyor assembly of claim 12, wherein each of the plurality of hooks defines a straight portion at a distal end of the plurality of hooks, wherein the straight portion defines a bend angle.

14. The conveyor assembly of claim 12, wherein the curved portion defines a radius of curvature, wherein the radius of curvature is 0.156 radians.

15. A method of coupling at least one side rail with at least one side guide of a conveyor assembly, the method comprising:
positioning the at least one side guide above the at least one side rail;
aligning each of a plurality of hooks of the at least one side guide with a corresponding hole of a plurality of holes of the at least one side rail;
positioning each of the plurality of hooks of the at least one side guide within the corresponding hole of the plurality of holes of the at least one side rail; and
bending each of the plurality of hooks to couple the at least one side rail to the at least one side guide.

16. The method of claim 15, wherein bending each of the plurality of hooks comprises bending a distal end of each of the plurality of hooks in an upward direction.

17. The method of claim 15, wherein:
each of the plurality of hooks defines a curved portion,
each of the plurality of hooks defines a straight portion at a distal end of the plurality of hooks,
prior to the step of bending each of the plurality of hooks, the straight portion of each of the plurality of hooks extends at a first angle of 137 degrees with respect to a plane of a flange portion of the at least one side guide, and
after the step of bending each of the plurality of hooks, the straight portion of each of the plurality of hooks extends at a second angle that is less than 15 degrees with respect to the plane of the flange portion of the at least one side guide.

18. The method of claim 15, further comprising:
bending each of a plurality of tabs on a flange portion of the at least one side guide to form the plurality of hooks,
wherein the step of bending each of the plurality of tabs occurs prior to the step of bending each of the plurality of hooks.

* * * * *